United States Patent
Izquierdo Gil (10) Patent No.: US 11,211,877 B2
(45) Date of Patent: Dec. 28, 2021

(54) HIGH POWER GENERATION SYSTEM FOR AN AIRCRAFT

(71) Applicant: AIRBUS DEFENCE AND SPACE, S.A.U., Madrid (ES)

(72) Inventor: Daniel Izquierdo Gil, Madrid (ES)

(73) Assignee: AIRBUS DEFENCE AND SPACE, S.A.U., Madrid (ES)

( * ) Notice: Subject to any disclaimer, the term of this patent is extended or adjusted under 35 U.S.C. 154(b) by 55 days.

(21) Appl. No.: 16/856,500

(22) Filed: Apr. 23, 2020

(65) Prior Publication Data

US 2020/0343826 A1    Oct. 29, 2020

(30) Foreign Application Priority Data

Apr. 25, 2019  (EP) .................................. 19382314

(51) Int. Cl.
*H02M 7/219* (2006.01)
*B64F 5/60* (2017.01)
*B64D 41/00* (2006.01)
*H02M 1/44* (2007.01)

(52) U.S. Cl.
CPC ............ *H02M 7/219* (2013.01); *B64D 41/00* (2013.01); *B64F 5/60* (2017.01); *H02M 1/44* (2013.01)

(58) Field of Classification Search
CPC .......... H02M 7/219; H02M 1/44; B64F 5/60; B64D 41/00
See application file for complete search history.

(56) References Cited

U.S. PATENT DOCUMENTS

| 4,684,873 | A | 8/1987 | Glennon |
| 6,038,152 | A | 3/2000 | Baker |
| 2014/0104901 | A1 | 4/2014 | Nguyen |
| 2015/0303822 | A1 | 10/2015 | Casimir et al. |

FOREIGN PATENT DOCUMENTS

FR    3 050 882    11/2017

OTHER PUBLICATIONS

Extended European Search Report for EP Application No. 19382314.3 dated Nov. 7, 2019, 8 pages.

*Primary Examiner* — Robert L Deberadinis
(74) *Attorney, Agent, or Firm* — Nixon & Vanderhye P.C.

(57) ABSTRACT

A high power generation system for aircraft includes: a non-propulsive mechanical power source turning a permanent magnet generator (PMG) to generate AC electrical power; a high voltage rectifier unit (HVRU) converting the AC electrical power to DC electrical power, and a control unit controlling the rotational speed of the non-propulsive mechanical power source and the HVRU, wherein the HVRU is configured to increase voltage and current of the DC electrical power using at least one winding of the PMG.

20 Claims, 5 Drawing Sheets

HIGH POWER GENERATION SYSTEM FOR AN AIRCRAFT

RELATED APPLICATION

This application claims priority to European Patent Application EP19382314.3, filed Apr. 25, 2019, the entirety of which is incorporated by reference.

TECHNICAL FIELD

The present invention belongs to the field of power supply, in particular to the field of power generation and conversion. More specifically, the invention is of the special application in the aeronautic industry for powering electrical equipment such electrical engines, radar antennas, high energy laser systems or any other DC (Direct Current) network boarded within the aircrafts.

BACKGROUND

An Airborne Warning and Control System (also known as AWACS) is an airborne radar antenna picket system boarded in an aircraft and configured to detect objects in the vicinity. Such radar antenna system is an additional electrical system, in the form of a DC network, normally incorporated into a conventional aircraft architecture which further requires an increment of power generation.

Another additional electrical system, in the form of a DC network, is a high energy laser system normally also incorporated into conventional aircraft architecture further requiring an increment of power generation. This laser system is a measurement system by means of a laser boarded in an aircraft and configured to measure the distance between the aircraft and the objects of the vicinity.

This increment of power generation required should be enough as to supply electrical power to such additional electrical systems, a so-called DC network, incorporated in the conventional configuration of the aircraft.

In this sense, the electrical power that the aircraft should provide is substantially doubled, up to an additional 400 kW (kiloWatts). Moreover, the power should be supplied, at least, as 270V (volts) Direct Current (DC) while the conventional configuration of the aircraft's electrical grid is around 28V (DC). All this leads to a major adaptation of the aircraft architecture.

Figure 1:
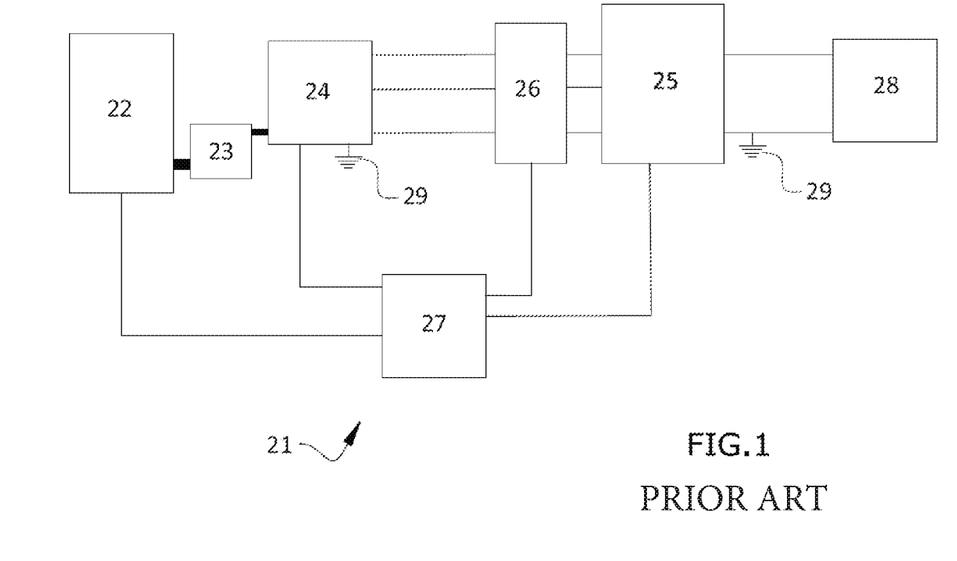
FIG. 1 shows a schematic power generation system according to the prior art.

In conventional radar electrical architecture, for instance, an aircraft radar antenna is powered by a power generator system as shown in FIG. 1. Particularly, this power generation system comprises a diesel engine for generating mechanical power that afterwards is converted to AC electrical power by a Variable Frequency Generator (VFG) mechanically connected to the engine through a gearbox. Once the AC electrical power is generated, the combination of a transformer and a High Voltage Rectifier Unit (HVRU) converts the AC electrical power generated to DC electrical power that will power the radar antenna.

However, this conventional approach to power the radar antenna is heavy and large, both of which present difficulties for aircraft. Furthermore, the HVRU of these systems needs a transformer for the AC/DC power conversion, particularly to increase, as desired, the voltage and the current of the power. The transformer also involves a weight and volume increase for the aircraft. Additionally, the behavior of the HVRU needs to be controlled, as well as the behavior of VFG that needs one additional gearbox due to the difference of rotational speed range respect to the engine, for instance, the diesel engine is around 3,500 rpm while the VFG is around 20,000 rpm. This gearbox required by the VFG also involves a weight and volume increase for the aircraft. A generator control unit needs to be modified in order to adapt VFG to this solution.

Therefore, in view of the aforementioned drawbacks of the known power generator systems for feeding a DC network as a radar antenna, the present invention provides an improved and lighter high power generator system for aircrafts, in particular for an aircraft radar antenna or high energy laser system.

SUMMARY

The present invention may be embodied to solve or at least mitigate the aforementioned problems In a first inventive aspect, the invention may be embodied as a high power generation system for a DC network with a load, such as a radar antenna, the high power generation system being configured to be boarded on an aircraft and comprising: a non-propulsive mechanical power source for generating rotating mechanical power, a permanent magnet generator (PMG) for converting the rotating mechanical power generated by the non-propulsive mechanical power source to AC electrical power, the PMG comprising at least one winding, a high voltage rectifier unit (HVRU) for converting the AC electrical power to DC electrical power, the HVRU comprising an AC electrical power input and a DC electrical power output, and a control unit for controlling the rotational speed of the power source and for controlling the HVRU, wherein the HVRU is configured to also increase the voltage and the current of the DC electrical power output by means of the at least one winding of the PMG.

The DC network load described herein may be included in an anti-pollution system, electrical engines, high energy laser system, and/or the like.

Moreover, through this entire document, the expression "high" for the high power generation system will be understood as that this power generator system is suitable for providing 100 kW or more.

The present power generation system starts generating rotating mechanical power by the non-propulsive mechanical power source. In a particular embodiment, this non-propulsive mechanical power source is a diesel engine, or a gas turbine, or other types of combustion engines with drive shaft outputs or the like. Once rotating mechanical power is generated, a permanent magnet generator (PMG) converts the rotating mechanical power to AC electrical power. The AC electrical power is then converted to DC electrical power by a high voltage rectifier unit (HVRU) to power a load, e.g., a radar antenna, powered by a DC network.

Both the non-propulsive mechanical power source and the PMG are mechanically connected so that since both have a similar rotational speed range. Thus, the functionality of system is simpler and more efficient than the prior art power generation systems. Furthermore, this new system does not require a gearbox between the DC power source and the generator, therefore, the present system advantageously also reduces weight and volume on the aircraft.

A control unit is also provided in the present power generation system to control the rotational speed of the power source and the voltage and current increase of the DC power provided by the HVRU. For this system, the generator does not need to be controlled as in the prior art because the PMG (permanent magnet generator) advantageously rotates according to the rotational speed imposes by the non-propulsive power source. Furthermore, the PMG can be switched off by stopping the rotating mechanical power coming from the power source, that is, to turn off the non-propulsive power source. Advantageously, the present power generation system allows disconnecting the power source, thus, the system meets the safety requirement to be able to disconnect excitation in this system. That is, the disconnection of the mechanical power source by the action of the control unit stops the excitation of the PMG. By contrast, in the prior art power generation systems, both power source and the generator needs to be independently controlled.

In this sense, the PMG according to the invention advantageously is a simpler power generator which does not need a particular controlled as the VFG of the prior art generator which requires to be switched on/off.

For the conversion of AC/DC electrical power and the increase of the voltage and current of such power for being supplied to the DC network, the HVRU takes advantage of the windings of the PMG. That is, the present power generation system does not need additional components for achieving the increase of the voltage and current of the power to be supplied to the load. The present system advantageously make use of a winding of the PMG for this voltage and current increase.

In another embodiment, the load in the DC network is a radar antenna. More preferably, the load in the DC network is an Airborne Warning and Control System, e.g., an airborne radar antenna picket system boarded in an aircraft and configured to detect objects in the vicinity.

In another embodiment, the load in the DC network is a high energy laser system that it is understood as a measurement system for measuring the distance between the aircraft and objects in the vicinity.

In a particular embodiment, the present system further comprises: a first monitor for monitoring at least a parameter of the AC electrical power supplied by the PMG, and/or a second monitor for monitoring at least a parameter of the outgoing DC electrical power of the HVRU; wherein both monitor are in data communication with the control unit.

The first monitor are configured to monitor the properties of the AC electrical power that the PMG generates. The second monitor are configured to monitor the properties of the DC electrical power that the HVRU supplied at the end of the power generation system. Since both monitor are in data communication with the control unit, the data monitored by them is used by the control unit to control the power generation system. The control unit advantageously protects the high power generation system against overvoltage, undervoltage, overcurrent, In an embodiment, the first monitor is a sensor connected at the output of the PMG, and the second monitor is a sensor connected at the output of the HVRU. These sensors can monitor different parameters of the electrical power such as the voltage and/or frequency.

In a particular embodiment, the PMG comprises a position sensor in data communication with the HVRU for monitoring the position of the at least one winding of the PMG. The position of the winding of the PMG in real time is useful for the HVRU since it take advantage of these windings for increasing the voltage and current of the DC electrical power generated by the HVRU.

Advantageously, the position sensor provided in the present power generation system optimizes the system control and improves the system efficiency.

In a particular embodiment, the present system further comprises: a first switch for switching the AC electrical power input to the HVRU, and/or a second switch for switching the DC electrical power output from the HVRU to the load; wherein both switch are connected to the control unit, this control unit being configured to control the operation of both switch.

The first switch regulates the passage of the AC electrical power between the PMG and the HVRU, thus, according to the data monitored by the first monitor, the control unit influences the control of this first switch. The second switch regulates the passage of the DC electrical power between the HVRU and the DC network, thus, according to the data monitored by the second monitor, the control unit influences the control of this second switch. Therefore, the present power generation system advantageously regulates the passage of the electrical power by the control unit according to the data monitored in this system. In addition, the control unit advantageously protects the high power generation system against overvoltage, undervoltage, and/or overcurrent.

In an embodiment, the AC electrical power input comprises a voltage between 140V and 196V. The AC electrical power input corresponds to the electrical power generated by the PMG which goes to the HVRU for its conversion to DC electrical power, that is, corresponds to HVRU power input. This voltage range for the AC electrical power input is the necessary voltage that the AC electrical power must have before being sent to the HVRU.

In an embodiment, the HVRU comprises:
(i) a controlled bridge, preferably comprising antiparallel diodes and IGBT Transistors, the controlled bridge being configured to convert the AC electrical power input into rectified electrical power output,
(ii) a Radio Frequency, RF, filter for filtering the rectified electrical power output, obtaining a DC electrical power output, and
(iii) a processor in data communication with the controlled bridge, the RF filter and the control unit,
(iv) wherein the controlled bridge is energized by the winding of the PMG in such a way that the voltage and the current of the electrical power current fed the HVRU is increased.

In a particular embodiment, the DC electrical power output supplied by the HVRU is approximately 270V DC. The DC electrical power output corresponds to the electrical power generated by the HVRU which is supplied to the DC network, that is, it corresponds to HVRU power output. This voltage of the DC electrical power output is the necessary voltage that the DC electrical power must have for supplying to the DC network.

In a particular embodiment, the DC electrical power output is connected to the ground of the aircraft fuselage, and the high power generation system further comprises a galvanic isolation. Connecting the DC electrical power to the ground of the aircraft fuselage and including a galvanic isolation, allows the present system to avoid a need for a transformer between the AC step and DC step. Particularly, in the known prior art systems both, the DC network and the VFG, must be connected to the ground of the aircraft fuselage, whereas in the present solution the PMG does not need to be connected to the ground of the aircraft fuselage thanks to this galvanic isolation. Therefore, in view of the prior art systems, the present power generation system reduces weight and volume on the aircraft, as well as the present system is saved connecting the PMG to the ground.

In an embodiment, the non-propulsive mechanical power source has a rotational speed between 2600 rpm and 4300 rpm.

In a particular embodiment, the present system further comprises a built-in test (BIT) system in data communication with the control unit, the BIT system being configured for the system to test itself. Advantageously, the BIT system allows the high power generation system to know at all the times the operational state of each component of this system. Particularly, each component (at least the non-propulsive mechanical power source, PMG and the HVRU) of the high power generation system comprises a BIT system connected to the control unit. According to this data communication between the control unit and the BIT system, the control unit advantageously protects the high power generation system against overvoltage, undervoltage, overcurrent, In a particular embodiment, the PMG is configured to rotate at the same rotational speed of the non-propulsive mechanical power source. The PMG may be directed connected to a rotational drive, e.g., drive shaft, of the non-propulsive mechanical power source. There need be no gearbox between the PMG and the non-propulsive mechanical power source.

The invention may also be embodied as a method for generating a DC electrical power by the high power generation system according to the following steps:

(A) generating rotating mechanical power by a non-propulsive mechanical power source, (B) converting the rotating mechanical power generated to AC electrical power by the PMG which is turned at the same rotational speed as a drive from the non-propulsive mechanical power source, and (C) converting the AC electrical power to DC electrical power by a HVRU;

(D) controlling the rotational speed of the non-propulsive power source and the HVRU, and (E) the step c) comprises increasing the voltage and the current of the DC electrical power by means of the at least one winding of the PMG.

The method may be performed in an aircraft.

The PMG of the high power generation system may include a floating AC electrical power level relative to the aircraft ground.

The aircraft may include a radar antenna and/or a high energy laser system which is powered by the DC electrical power output by the HVRU.

All the features described in this specification (including the claims, description and drawings) and/or all the steps of the described method can be combined in any combination, with the exception of combinations of such mutually exclusive features and/or steps.

SUMMARY OF THE DRAWINGS

These and other characteristics and advantages of the invention will become clearly understood in view of the detailed description of the invention which becomes apparent from the embodiment of the invention disclosed herein, given just as an example and not being limited thereto, with reference to the drawings.

DETAILED DESCRIPTION

Firstly, it is to be noted that for illustrative purposes, only a power generation system for supplying power to a radar DC (direct current) network, will be described thereafter. Nevertheless, the DC network according to the invention may be also comprised by a load such as an anti-pollution system, electrical engines, high energy laser system, or the like. Therefore, the same power generation system for DC network of an aircraft described hereafter will also applies to the mentioned aircraft systems, indistinctly.

FIG. 1 show a schematic power generation system known in the prior art for supplying DC electrical power to an aircraft load (28), such as a radar antenna. This particular system (21) comprises a no-propulsive power source (22) as a diesel engine that generates rotating mechanical power for initially powering this system (21).

The system (21) further comprises a Variable Frequency Generator (VFG) (24), for converting the rotating mechanical power into AC electrical power. Both diesel engine (22) and VFG (24) are mechanically connected by a gearbox (23). This gearbox (23) is needed due to the rotational speed difference between the diesel engine (22) and VFG (24), i.e. the diesel engine (22), includes a drive shaft operating at a rotational speed in a range of 3000 rpm to 4000 rpm, and the VFG (24) in configured to turn at a rotational speed of approximately 20000 rpm.

The system (21) also comprises a high voltage rectifier unit (HVRU) (25), and a transformer (26) both working in combination for converting the AC electrical power to DC electrical power. By means of this transformer (26) the system (1) increases the voltage and the current of the electrical power until reaching the desired values for the supply.

The system (21) comprises a control unit (27) for controlling the operation of the VFG (24), in particular, to connect/disconnect the VFG (24). However, this system (21) does not control the non-propulsive power source (22). The control unit (27) also controls the operation of the transformer (26) and the HVRU (25) for the conversion of the AC electrical power to DC electrical power.

As it can observed in the system (21) shown in FIG. 1, the VFG (24) is connected to the ground (29) of the aircraft as well as the DC electrical power generated by the HVRU (25) is also connected to the ground (29) of the aircraft. This requires to have galvanic isolation by means of one transformer (26), which implies an increase in weight and volume.

A. High Power Generation System (1) for a Load (16)

Figure 2:
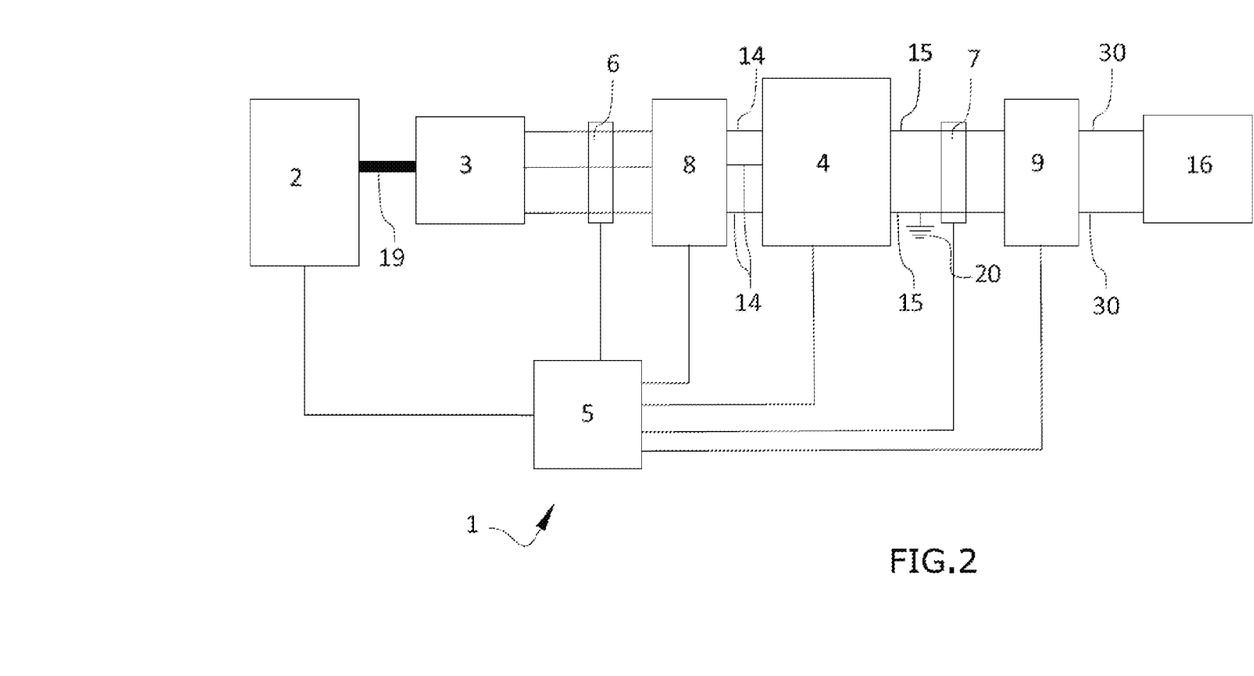
FIG. 2 shows a schematic power generation system according to an embodiment of the present invention.

FIG. 2 shows a schematic high power generation system (1) for a DC network of an aircraft load. In a particular example, the aircraft load (16) is a radar antenna (34). In another particular example, the aircraft load (16) is a high energy laser system (35) (shown in FIG. 5).

The high power generation system (1) comprises a non-propulsive mechanical power source (2) that generates rotating mechanical power for powering the high power generation system (1). That is, the non-propulsive rotating mechanical power source (2) is the initial power supply of the present system (1). The non-propulsive mechanical power source (2) of the system (1) may be a diesel engine.

The non-propulsive power source (2) is mechanically connected to a permanent magnet generator (PMG) (3) by means of a mechanical connection (19), such as a drive shaft. The drive shaft (19) may be directly connected to a rotor of the PMG such that the rotor and drive shaft turn at the same rotational speed. The PMG (3) generates electrical power by converting the rotating mechanical power generated from the non-propulsive mechanical power source (2) to AC electrical power. For example, rotor in the PMG includes permanent magnets. The rotation of the rotor in the PMG creates a rotating magnetic field in the windings of a stator of the PMG. Further, the PMG (3) comprises a permanent magnets system with a plurality of windings that provides a permanent excitation field.

This system (1) further comprises a high voltage rectifier unit (HVRU) (4) that converts the AC (alternating current) electrical power coming from the PMG (3) to DC electrical power, and also increases the voltage of this DC electrical power. Particularly, the HVRU (4) comprises an AC electrical power input (14) through which the AC electrical power generated by the PMG (3) goes into the HVRU (4), and a DC electrical power output (15) through which the DC electrical power goes out the HVRU (4).

The HVRU (4) makes use of the windings of the PMG (3) for increasing the voltage of the DC electrical power. The internal inductances of the PMG (3) are used as part of the HVRU (4). Therefore one rectifier/boost topology is implemented without no additional elements, like inductances.

The system (1) of FIG. 2 also shows a control unit (5) in charge of controlling the operation of the power generation system (1), particularly, the control unit (5) controls the rotational speed of the power source (2) and the operation of the HVRU (4).

The system (1) further comprises a first monitor (6), e.g., voltage and/or current meter, that monitors parameters of the AC electrical power generated by the PMG (3). The first monitor (6) is located between the PMG (3) and the HVRU (4). The system (1) also comprises a second monitor (7), e.g., voltage and/or current meter, that monitors parameters of the DC electrical power generated by the HVRU (4). The second monitor (7) is located at the end of the system (1), that is, after the HVRU (4).

Both first (6) and second (7) monitors are in data communication with the control unit (5). In this sense, these monitors (6, 7) monitor parameters, e.g., voltage and/or electrical power current, and provides data on the monitor parameters to the control unit (5). The control unit (5) regulates the passage of this electrical power according to whether the parameters reach at least a minimum value desired, as well as do not exceed a maximum value allowed. The AC electrical power input (14) may have a voltage in a range of 140V to 196V, and a frequency between 417 Hz and 583 Hz; as well as the DC electrical power output (15) has a voltage of 270V.

The PMG (3) comprises a position sensor (not shown) in data communication with the HVRU (4) and in charge of sensing/monitoring the position of the windings in the PMG (3). This position provides information of the most efficient points of PMG (3) operation, and which reduces the electrical losses of PMG (3). In this way, the HVRU (4) knows in real time the position of the winding and use the position information to increase the voltage and current of the DC electrical power in the HVRU (4).

The system (1) shown in FIG. 2 further comprises a first switch (8) located between the first monitor (6) and the HVRU (4) and connected to the control unit (5). In this way, according to the data monitored by the first monitor (6) the control unit (5) controls the passage of the AC electrical power to the HVRU (4) by means of the first switch (8).

In addition, the system (1) comprises a second switch (9) located at the output (30) of the system (1), that is, after the second monitor (7); and also connected to the control unit (5). Thus, according to the data monitored by the second monitor (7) the control unit (5) controls the supply of the DC electrical power to the load (16) of the DC network.

Furthermore, in the high power generation system (1) the DC electrical power supplied by the HVRU (4) is connected to the ground of the aircraft fuselage (18) (shown in FIG. 4) as it is shown with the ground reference (20) in FIG. 2. The present power generation system (1) may need to connect only the DC electrical power to the ground of the aircraft instead of the prior art power generation systems which needs also to connect the VFG to the ground of the aircraft as it is described for the power generation system (21) shown in FIG. 1.

Both the non-propulsive power source (2) and the PMG (3) rotates with a similar rotational speed. The rotation speed may be in a range of 2600 rpm to 4300 rpm.

In a particular example, the high power generation system (1) comprises a built-in test, BIT, system that permits the system (1) to test itself. In a more particular example, at least the non-propulsive mechanical power source, PMG and the HVRU each one comprises a BIT system.

Figure 3:
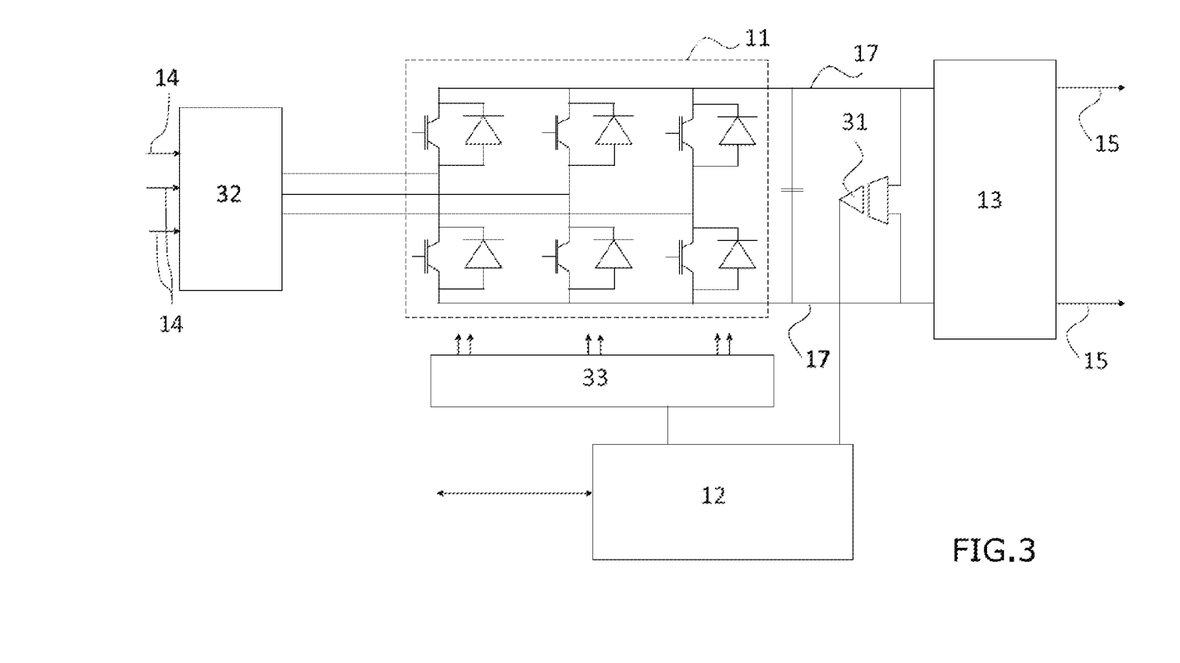
FIG. 3 shows a schematic High Voltage Rectifier Unit of the present power generation system according to an embodiment of the present invention.

FIG. 3 shows a schematic HVRU (4) of the system (1) shown in FIG. 2. Particularly, the HVRU (4) comprises a controlled bridge (11) with antiparallel diodes and IGBT (Insulated-gate bipolar transistor) Transistors. This controlled bridge (11) converts the AC electrical power input (14) into rectified electrical power output (17). Further, the HVRU (4) comprises an input RF (radio frequency) filter (32) that filters the AC electrical power of input (14) for the controlled bridge (11) and an output RF filter (13) that filters the rectified electrical power output (17) for obtaining a DC electrical power output (15). The HVRU (4) further comprises a processing means (12) in data communication with the controlled bridge (11) and with the RF filter (13) and the control unit (5). In this sense, the control unit (5) has absolute control over the electrical power current running through the HVRU (4). The HVRU (4) further comprises IGBT drivers (33) for controlling the operational status of the IGBT Transistors.

The controlled bridge (11) of this HVRU (4) is energized by at least one of the windings of the PMG (3). With this energization, the HVRU (4) is able to increase the voltage and the current of the electrical power fed by the HVRU (4).

This HVRU (4) shown on FIG. 3 further comprises an operational amplifier (31) connected to the rectified electrical power output (17) and to the processor (12), e.g., controller, computer and/or microprocessor. This operational amplifier (31) measures the voltage of the rectified electrical power output (17).

B. Aircraft (10) Comprising a High Power Generation System (1)

Figure 4:
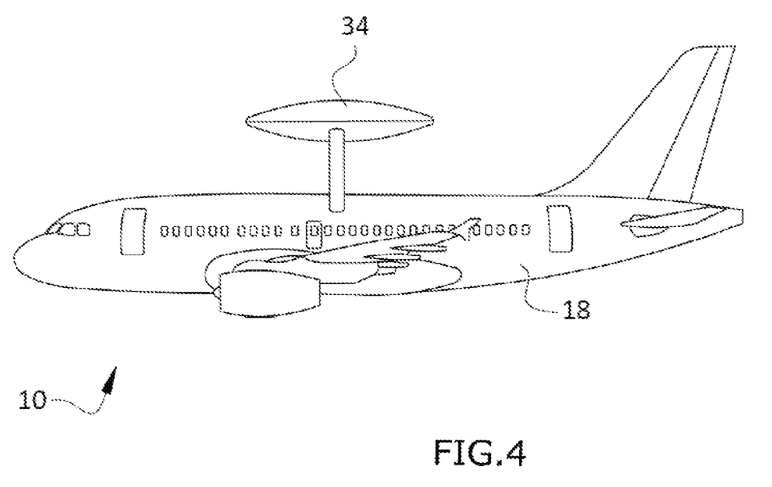
FIG. 4 shows a schematic view of an aircraft according to an embodiment of the present invention.

FIG. 4 shows a schematic view of an aircraft (10) comprising a radar antenna (34) that is powered by the high power generation system (1) shown in FIG. 2.

Figure 5:
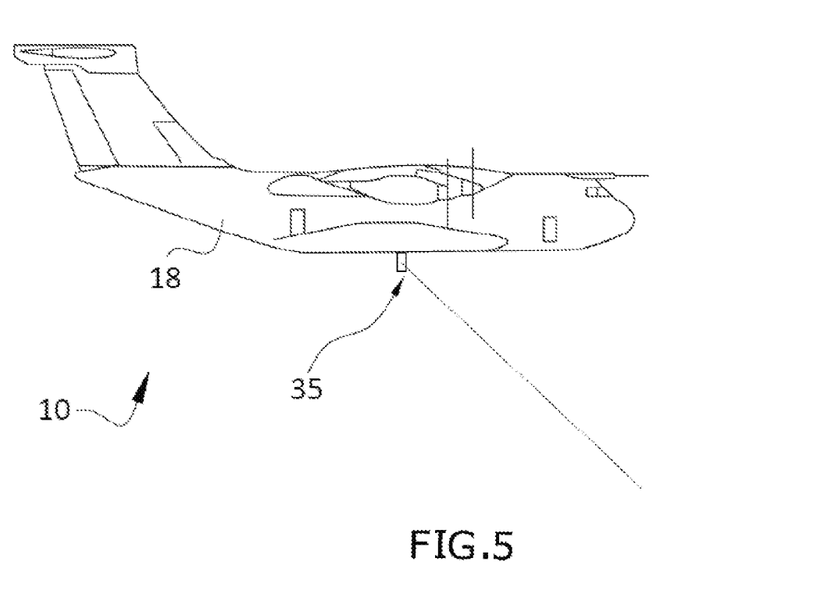
FIG. 5 shows a schematic view of an aircraft according to an embodiment of the present invention.
Figure 6:
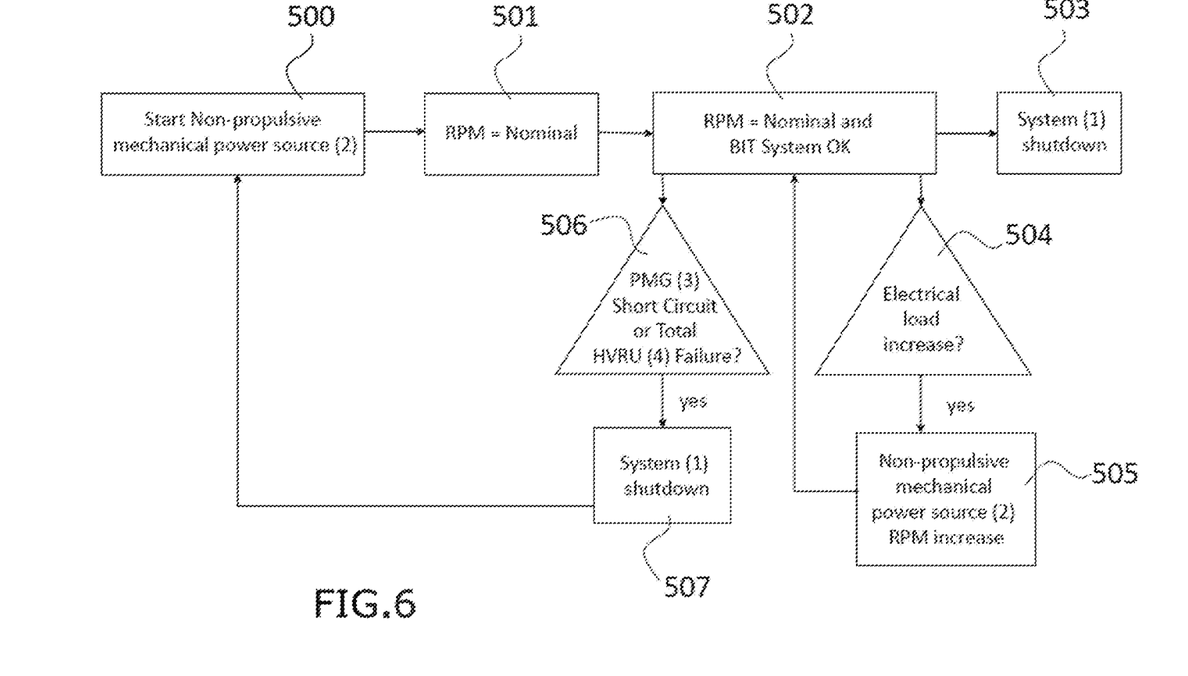
FIG. 6 shows a schematic flowchart of an embodiment of the method for generating a DC electrical power by the high power generation system according to the present invention.

FIG. 5 shows a schematic view of an aircraft (10) comprising a high energy laser system (35) that is powered by the high power generation system (1) shown in FIG. 2.

The DC electrical power output (15) supplied by the HVRU may be connected to the ground of the aircraft fuselage (18). Furthermore, the system (1) may comprises a galvanic isolation with respect to other electrical systems of the aircraft (10).

C. Method for Generating a DC Electrical Power to a Load (16)

The present invention may be embodied as a method for generating a DC electrical power for an aircraft load (16) by the high power generation system (1) shown in FIG. 2. This method comprises the following steps:

(A) generating rotating mechanical power by the non-propulsive mechanical power source (2), (B) converting the rotating mechanical power generated to AC electrical power by the PMG (3), and (C) converting the AC electrical power to DC electrical power by the HVRU (4); and (D) controlling by the control unit (5) the rotational speed of the power source (2) and the HVRU (4), and the step c) comprises increasing the voltage and the current of the DC electrical power by the at least one winding of the PMG (3).

According to the each step of this method, the monitors (6, 7) has an operating mode, as well as the switches (8, 9) controls the passage of the electrical power and the HVRU (4) has an operating state.

FIG. 5 shows a particular example of an operating status of the present method according to a plurality of stages (500, 501, 502, 503, 504, 505, 506, 507).

In the stage "start non-propulsive mechanical power source (2)" (500), the non-propulsive mechanical power source (2) starts its operation for generating rotating mechanical power. In this stage (500), the high power generation system (1) comprises the following operating status:

the first switch (8) is open,
the second switch (9) is open, and
the HVRU (4) is off.

That is both switches (8, 9) and the HVRU (4) are disconnected, so that the high power generation system (1) is only carrying out the generation of rotating mechanical power.

In the stage "RPM=Nominal" (501), the PMG (3) starts converting the rotating mechanical power to AC electrical power when its rotational speed reaches the nominal speed. In this stage (501), the high power generation system (1) has the following operating status:

the first switch (8) is closed,
the second switch (9) is open, and
HVRU (4) is on.

At this stage (501), the rotating mechanical power is converted to AC electrical power by the PMG (3) and is driven though the AC electrical power input (14) for its further conversion in the HVRU (4). In addition, in this stage (501) the first monitor (6) monitors parameters of the AC electrical power generated by the PMG (3).

In the stage "RPM=Nominal and BIT System OK" (502), once the control unit (5) is informed by the BIT system that each component of the system (1), or the ones that are of interest at this point, are operating correctly, the control unit (5) allows the HVRU (4) starts converting the AC electrical power coming from the PMG (3) to DC electrical power. In this stage (502), the high power generation system (1) has the following operating status:

the first switch (8) is closed,
the second switch (9) is closed, and
HVRU (4) is on.

That is, the AC electrical power is converted to DC electrical power in the HVRU (4) for being supplied to the load (16) through the outlet (30) of the system (1). Further, in this stage (502) the second monitor (7) monitors parameters of the DC electrical power generated by the HVRU (4).

In the stage "System (1) shutdown" (503), the present high power generation system (1) is shut down and has the following operating status:

non-propulsive mechanical power source (2) is off,
the first switch (8) is open,
the second switch (9) is open, and
HVRU (4) is off.

On the other hand, a different stage identified as "PMG (3) Short Circuit or Total HVRU (4) Failure?" (506) is also foreseen. In this stage (506) if there is a short circuit on the PMG (3) or a failure on the HVRU (4), both are detected by the present system (1). Accordingly, the control unit (5) request the shutdown (507) of both the non-propulsive mechanical power source (2) and the HVRU (4). In the stage "System (1) shutdown" (507) the high power generation system (1) has the following operating status:

non-propulsive mechanical power source (2) is off, and
HVRU (4) is off.

Furthermore, when the HVRU (4) is working, there is a further stage identified as "Electrical load increase?" (504) where the electrical load may be increased. In such a case, the control unit (5) is responsible for requesting to the non-propulsive mechanical power source (2) by the stage "Non-propulsive mechanical power source (2) RPM increase" (505) to increase its RPM gradually.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A high power generation system for a direct current (DC) network with a load, the high power generation system configured to be boarded on an aircraft and comprising:

a non-propulsive mechanical power source configured to generate rotating mechanical power, a permanent magnet generator (PMG) configured to convert the rotating mechanical power generated by the non-propulsive mechanical power source to alternating current (AC) electrical power, the PMG comprising at least one winding, a high voltage rectifier unit (HVRU) configured to convert the AC electrical power to DC electrical power, the HVRU comprising an AC electrical power input and a DC electrical power output, and a control unit configured to control a rotational speed of the non-propulsive mechanical power source and control the HVRU, wherein the HVRU is configured to increase voltage and current of the DC electrical power using the at least one winding of the PMG.

2. The high power generation system according to claim 1, further comprising:

a first monitor configured to monitor a parameter of the AC electrical power converted by the PMG, and a second monitor configured to monitor a parameter of the DC electrical power converted by the HVRU;

wherein the first and second monitors are in data communication with the control unit.

3. The high power generation system according to claim 1, wherein the PMG comprises a position sensor in data communication with the HVRU, wherein the position sensor monitors a position of the at least one winding of the PMG.

4. The high power generation system according to claim 1, further comprising:

a first switch configured to switch the AC electrical power input to the HVRU, and a second switch configured to switch the DC electrical power output from the HVRU to the load;

wherein the first and second switches are controlled by the control unit.

5. The high power generation system according to claim 1, wherein the AC electrical power input comprises a voltage in a range of 140 volts and 196 volts.

6. The high power generation system according to claim 1, wherein the HVRU comprises:

a controlled bridge configured to convert the AC electrical power input to rectified electrical power output, a Radio Frequency (RF) filter configured to filter the rectified electrical power output, obtaining a DC electrical power output, and a processor in data communication with the controlled bridge, the RF filter and the control unit, wherein the controlled bridge is energized by the at least one winding of the PMG such that the voltage and the current of the electrical power current fed the HVRU is increased.

7. The high power generation system of claim 6 wherein the control bridge comprises antiparallel diodes and IGBT Transistors.

8. The high power generation system according to claim 1, wherein the DC electrical power output is 270V DC.

9. The high power generation system according to claim 1, wherein the DC electrical power output is connected to an electrical ground of an aircraft fuselage, and the high power generation system further comprises galvanic isolation.

10. The high power generation system according to claim 1, wherein the non-propulsive mechanical power source has a rotational speed in a range of 2600 rpm to 4300 rpm.

11. The high power generation system according to claim 1, further comprising a built-in test system in data communication with the control unit, wherein the built-in test system is configured to test the system.

12. The high power generation system according to claim 1, wherein the PMG and the non-propulsive mechanical power source rotate at a same speed.

13. The high power generation system according to claim 1, wherein the non-propulsive mechanical power source includes a rotating drive shaft and a rotor of the PMG is directly driven by the rotating drive shaft at a rotational speed of the drive shaft.

14. The high power generation system of claim 1 wherein the load is at least one of a radar antenna and a high energy laser system.

15. An aircraft comprising the high power generation system according to claim 1.

16. The aircraft according to claim 15, wherein the PMG includes a floating AC electrical power level relative to an electrical ground of the aircraft.

17. The aircraft according to claim 15, further comprising at least one of a radar antenna and a high energy laser system.

18. A method for generating a DC electrical power in an aircraft using a high power generation system including a PMG and a HVRU, wherein the method comprises:

generating rotating mechanical power by a non-propulsive mechanical power source, converting, by the high power generation system, the rotating mechanical power generated to AC electrical power by the PMG, wherein the PMG and non-propulsive mechanical power source operate at a common rotational speed, and converting the AC electrical power to DC electrical power by the HVRU, wherein the conversion of the AC electrical power to DC electrical power includes increasing voltage and current of the DC electrical power using at least one winding of the PMG, and controlling the rotational speed of the non-propulsive power source to achieve a desired voltage and/or current level of the DC electrical power.

19. The method of claim 18, further comprising galvanically isolating the high power generation system from other electrical systems in the aircraft.

20. The method of claim 19, further comprising grounding the high power generation system to a ground in the aircraft solely by at least one ground connection between a DC output of the HVRU and the ground.

* * * * *